United States Patent Office 3,038,874
Patented June 12, 1962

3,038,874
MIXED POLYCARBONATES OF BISPHENOL A AND TETRACHLOROBISPHENOL A
Thomas M. Laakso and David A. Buckley, Rochester, N.Y., assignors to Eastman Kodak Company, Rochester, N.Y., a corporation of New Jersey
No Drawing. Filed May 25, 1959, Ser. No. 815,251
2 Claims. (Cl. 260—42)

This invention relates to an improved polycarbonate predominantly of bisphenol A which is a uniform physical mixture of highly polymeric homopolymers essentially composed of (I) from 70 to 80 mole percent of a homopolymer composed of recurring units derived from bisphenol A and (II) from 20 to 30 mole percent of a homopolymer composed of recurring units derived from tetrachlorobisphenol A. This invention also relates to a process for preparing these mixed polymers. The polymers are characterized by having high heat softening temperatures, a high Young's Modulus of elasticity and a high degree of flexibility. Useful photographic elements are also included in this invention wherein a film of the improved polycarbonate supports a coating of light-sensitive emulsion. Less advantageous but valuable polymers contemplated by this invention are as described except that the range in (I) is 40 to 80 instead of 70 to 80 and the range in II is 20 to 60 instead of 20 to 30; however, it is obvious from the table of data and other information below that the preferred mixed polymers of this invention are surprisingly superior to these less advantageous mixtures which are none-the-less also contemplated.

The preparation of polycarbonates of the general class with which this invention is concerned is well known in the art. A number of patents have been issued in the last few years describing polycarbonates prepared from bisphenol A and from tetrachlorobisphenol A. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved polycarbonate predominantly derived from bisphenol A which has quite unusual properties which were unexpected in view of the prior art.

A further object of this invention is to provide a process for preparing such improved polycarbonates.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate predominantly of bisphenol A consisting of a physical mixture of highly polymeric homopolymers each having an inherent viscosity of from about 0.5 to about 3.5 essentially composed of:

I. From 70 to 80 mole percent of a homopolymer composed of recurring units having the following formula (A):

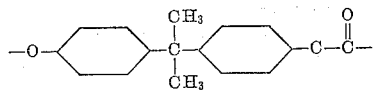

and

II. From 20 to 30 mole percent of a homoploymer composed of recurring units having the following formula (B):

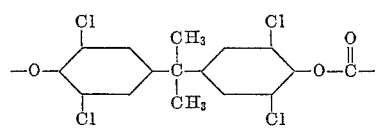

said mixture of polymers being characterized by (a) having a heat softening temperature which is at least 35° C. greater than a random copolymer having the same overall composition of recurring units and is at least 190°–210° C., (b) having a Young's Modulus of elasticity for film which is at least 10% greater than for both the homopolymer of units of formula (A) and the said random copolymer and is at least 25,500 kg./sq. cm., and (c) having a flexibility measured by the MIT folds test substantially as great as for the homopolymer of units of formula (A), at least 100% greater than for said random copolymer and is on the order of about 150 folds.

Thus, this invention provides a highly useful series of high molecular weight mixed polymers consisting of a linear polycarbonate of 2,2-bis(4-hydroxyphenyl)propane and a linear polycarbonate of 2,2-bis(3,5-dichloro-4-hydroxyphenyl)propane. This series of mixed polymers possesses to a surprisingly satisfactory degree the valuable properties of both of the polymers present in the mixed polymer. This is considered an unobvious discovery for various reasons including the fact that neither the random copolymers nor other mixtures of the individual high molecular weight homopolymers yield the results achieved in accordance with this invention. Moreover, the series of mixed polymers encompassed by this invention have a most unexpectedly high degree of flexibility as measured by the MIT folds test and which is an important characteristic of any film to be used as a support for a photographic element. This is also true as regards the extremely high and unobvious heat distortion temperatures on the order of about 200° C.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenyl) propane. It appears that such bisphenol A polycarbonates are not only being commercially used for many of the purposes for which films in general are useful but that they are also being contemplated for certain rather severely limited utility as a photographic film support. However, the use of polycarbonates from bisphenol A as a photographic base is very seriously limited by the fact that the Young's Modulus of elasticity is only somewhere on the order of about 23,000 kg./sq. cm. This compares quite unfavorably with other commercially available films bases such as cellulose triacetate where the Young's Modulus lies in the range of 30,000–40,000. Another film base useful for photographic purposes is oriented polystyrene which has a Young's Modulus somewhere in the order of about 32,000 kg./sq. cm.

It is obvious that for a photographic film base to be of significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although polyvinyl derivatives such as polystyrene can be solvent cast a film base prepared from polystyrene (even though it has been oriented) has a heat softening temperature on the order of only about 100° C. and therefore has rather limited utility. In contrast, the film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the MIT folds test of about 25–35 folds. Polystyrene is somewhat better and has an average flexibility of about 50.

With the development of polycarbonate films such as can be derived from bisphenol A it became obvious that they had promise with regard to their use as photographic film bases provided that the Young's Modulus of elasticity could be improved upon. One polycarbonate mentioned by Schnell and by others which appeared to have some promise was that derived from tetrachlorobisphenol A since this polycarbonate as a film has a Young's Modulus of elasticity of about 30,000 kg./sq. cm. This value is substantially the same as the lowest values ordinarily measured for cellulose triacetate film bases. However, the flexibility of well cured films of a homopolymer of tetrachlorobisphenol A was found to be extremely low and quite unsatisfactory for commercial applications as a photographic film base.

One possibility which was considered by the inventors was the preparation of random copolymers of tetrachlorobisphenol A and bisphenol A with a view toward obtaining a copolymer which might have improved flexibility and a reasonably high heat softening temperature along with all of the other properties necessary for satisfactory utility as a photographic film support. However, it was found that such modifications of the polycarbonate from the tetrachlorobisphenol A resulted in further reductions in the flexibility of films prepared therefrom. Moreover, the heat softening temperature was significantly reduced. Further work was also performed involving mixtures of homopolymers of tetrachlorobisphenol A with minor proportions of homopolymers from bisphenol A. In doing this it was found that the Young's Modulus was significantly reduced by even minor proportions of polymer from bisphenol A; however, it was quite unexpectedly found that a satisfactory value for marginal utility of limited use for photographic film purposes was retained for mixed polymers with even as little as 20–30 mole percent of polymer from tetrachlorobisphenol A.

It was, therefore, quite surprising when it was found that the mixed polymers prepared in accordance with the invention described herein had a Young's Modulus at least 10% greater than for the homopolymer derived from bisphenol A and at least about 25,500 kg./sq. cm. It was even more surprising to find that these mixed polymers had flexibility values measured by the MIT folds test of at least as great as for the homopolymer of bisphenol A and on the order of about 150 or more. Perhaps most surprising was the very high heat distortion temperatures on the order of about 190°–210° C. which is at least 35° C. greater than for the homopolymer from bisphenol A. Other tests disclosed that the polycarbonates contemplated by this invention had other properties and characteristics which rendered them quite useful as photographic film supports. Such properties have been adequately described in the prior art with regard to polycarbonates of this general type.

Perhaps the most outstanding property of the polycarbonate film bases is the retention of the Young's Modulus of elasticity at much higher temperatures than in the case of film from cellulose triacetate, polystyrene in oriented form and polyethylene terephthalate in oriented form. Thus, the polycarbonate films produced in accordance with the present invention retain to a substantial degree their high modulus of elasticity at temperatures up to and somewhat beyond their heat softening temperatures namely 190°–210° C. In contrast, the retention of Young's Modulus for polyethylene terephthalate begins to fall off very rapidly at temperatures of about 100° C. and becomes significantly less than the Young's Modulus for the polycarbonates of this invention at temperatures approaching 200° C. This factor also applies to film supports prepared from cellulose esters and polystyrene although the drop-off is not as pronounced as it is for polyethylene terephthalate. As a result, the polyesters of this invention have unusually valuable properties as photographic film supports at temperatures above 150° C.

Thus, according to this invention it has been found that by preparing mixed polymers consisting of polycarbonates derived from bisphenol A and tetrachlorobisphenol A (particularly 25 mole percent tetrachlorobisphenol A and 75 mole percent bisphenol A), there is obtained a significant improvement in the sub-standard properties without sacrificing any of the desirable values shown by the homopolymer of bisphenol A. These mixed polymers show physical properties quite different from the random copolymers prepared by conventional methods. That these mixed polymers are truly physical mixtures is shown by their solubility characteristics in dimethylformamide at 25° C. since in a physical mixture of the two homopolymers only the most soluble tetrachlorobisphenol A polymer is dissolved.

This invention can be further illustrated by the following examples of preferred embodiments although it will be understood that these examples are included merely for purposes of illustration and are not intended to limit the scope of the invention unless otherwise specifically indicated:

EXAMPLE 1

Preparation of mixed polycarbonate 25 mole percent tetrachlorobisphenol A—75 mole percent bisphenol A. Various runs were accomplished as follows:

In a 3-liter three-necked flask equipped with a stirrer, a thermometer and a dropping-funnel were placed 600 ml. of distilled water, 57 g. (1.4 moles) sodium hydroxide, 114 g. (0.5 mole) bisphenol A (M.P. 157–59° C.) and 5 g. of benzyltriethylammonium chloride. When a clear solution was obtained, the flask was cooled to 18°–20° C. and 1 liter of distilled methylene chloride was added. With efficient stirring 55 g. (0.55 mole) phosgene was bubbled into the solution which was kept at a pH of 13–14 within a period of about 55 minutes, keeping the temperature at about 18–20° C. At the end of this time the cooling was discontinued and it was stirred for 30 minutes after which it was neutralized with acetic acid, washed and precipitated by adding methyl alcohol. During various runs I.V.'s of 0.7–2.5 were obtained.

The above materials were combined while agitating in methylene chloride with similar runs prepared from tetrachlorobisphenol A, as follows:

In a 3-liter three-necked flask equipped with a stirrer, thermometer and dropping-funnel were placed 300 ml. of distilled water, 15 g. (0.35 mole) sodium hydroxide, 61.0 g. (0.167 mole) tetrachlorobisphenol A and 2 g. of benzyltriethylammonium chloride. When a clear solution was obtained, the flask was cooled to about 5° C. and 150 ml. of distilled methylene chloride was added. With good stirring 24.8 g. (0.25 mole) phosgene was added during a period of about 25 minutes, keeping the temperature at 18° C. The reaction was completed as described above. During various runs I.V.'s of from about 0.7 to 2.5 were obtained.

In preparing both of these polymers the polymerization was stopped by acidifying the reaction with glacial acetic acid. The methylene chloride layer was diluted with enough methylene chloride to allow more efficient stirring and water washing of the polymer solution free of soluble materials. The polymer was then precipitated from methylene chloride solution by slowly pouring the viscous dope into methyl alcohol. After leaching in fresh methanol, the polymer was dried at 50° C. under reduced pressure.

The yields of polymer were above 90% of their theoretical values. The preferred inherent viscosities (I.V.) for mixing were 0.9–1.8 measured in chloroform or in 1:1 phenol chlorobenzene solution. Mixtures were preferably obtained by dissolving the two polymers with agitation in methylene chloride or some other chlorinated hydrocarbon. Ratios of the polymers could be readily varied within the prescribed limits.

Of course, the methods of preparation of the two homopolymers are of no importance as long as the polymers obtained are relatively pure and have the desired inherent viscosities.

Procedures as described above can be applied to making either the BPA or the TCBPA polymer employing starting materials and reactants in the following proportions:

1.0 mole BPA or TCBPA
1.1 mole phosgene
2.8 moles sodium hydroxide
2.0 liters methylene chloride
1.2 liters water
1–5 grams catalyst, e.g. benzyltriethylammonium chloride, tri-isoamylamine, etc.

Depending upon variations in time, temperature, and other factors the polymer produced has any desired inherent viscosity in the range 0.7–2.5. The data in Table I for the 75% BPA:25% TCBPA mixture was based on a mixture where the homopolymer of BPA had an I.V. of 0.98 and the homopolymer of TCBPA had an I.V. of 1.08, as measured in chloroform. A preferred range is 0.9 to 1.8 with both components of the mixture being no further apart in I.V. than about 0.2 unit.

For comparative purposes, the following describes the preparation of a random-type copolycarbonate of 70 mole percent tetrachlorobisphenol A and 30 mole percent bisphenol A:

In a 3 l., three-necked flask equipped with a stirrer, a thermometer and a dropping-funnel were placed 76.86 g. (0.21 mole) tetrachlorobisphenol A and 20.52 g. (0.09 mole) bisphenol A, together with 33.6 g. (0.84 mole) sodium hydroxide and 800 ml. distilled water. When a clear solution was obtained, the flask was cooled by means of running water to 18° C. and 400 ml. of distilled methylene chloride was added, followed by 2 ml. tri-n-butyl amine and 2 g. benzyltriethyl ammonium chloride. With efficient stirring 33 g. (0.33 m.) phosgene dissolved in 80 ml. of distilled dry, cold methylene chloride was added slowly within a period of 25 minutes, keeping the temperature at 10–13° C. At the beginning of the polymerization reaction the solution had a flow time of 2.3 seconds as measured with a standard pipette. After 45 minutes of continuous stirring the flow time was 45 seconds. The polymerization was stopped by acidifying the reaction with glacial acetic acid. The methylene chloride layer was diluted with enough methylene chloride to allow more efficient stirring and water washing of the polymer solution free of soluble materials. The polymer was then precipitated from methylene chloride solution by slowly pouring the viscous solution into methyl alcohol. After leaching in fresh methanol, the polymer was dried at 50° under reduced pressure.

The yield of white fibrous copolymer was 85% of the theoretical value. It had an inherent viscosity of about 0.7 as measured in 1:1 phenol chlorobenzene solution.

*Physical Properties of Above Copolymer*

Young's Modulus_____ $2.85 \times 10^4$ kg. cm./cm.$^2$.
Yield and tensile_____ 825 kg./cm.$^2$.
Elongation_____ 5%.

Other properties are given in the table hereinbelow as to this random-type copolymer and others similarly prepared as shown.

One gram of various physical mixtures of tetrachlorobisphenol A (TCBPA) and bisphenol A (BPA) polycarbonates (both of viscosity near 1.0) was shaken on a "wrist-action" shaker with 5 ml. dimethylformamide at 25° C. Only about as much of the mixture went into solution as was proportionate to the TCBPA content.

Samples of physical mixtures of tetrachlorobisphenol A polycarbonate and bisphenol A polycarbonate were dissolved in methylene chloride (minimum amount). The polymers precipitated completely from the methylene chloride solution by slowly pouring it into methyl alcohol. The precipitated polymer was filtered and dried. A one-gram sample of this precipitated material was shaken with 5 ml. of dimethylformamide at 25° C. on a "wrist-action" shaker over night. Only about as much of the polymer mixture dissolved in the solvent as corresponded to the TCBPA content.

Other homopolymer mixtures and random copolymers were prepared following the techniques described in the preceding examples using variations in the prescribed conditions and materials so as to obtain the data set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove. Also included is data as to block copolymers as described in copending application Ser. No. 815,273 filed on even date herewith.

The preparation of film from these various polymers was generally accomplished using methylene chloride as the solvent in proportions such as 4 parts of solvent to 1 part of polymer or other suitable proportions to obtain a dope. The data was generally prepared by the machine coating technique employing a conventional coating machine having a dope hopper from which the dope is flowed onto a highly polished coating wheel from which it is stripped and cured as it passes through drying chambers. Of course, hand coating techniques can also be employed using apparatus wherein a coating knife with a vertically adjustable blade is used to manually spread the dope on a glass plate; the plate is put in an over and dried for an extended period of time such as 18 hours at about 70° F. Although methylene chloride was generally employed, other solvents can also be used (e. g. other halogenated hydrocarbons) for the preparation of a solution or dope of the polymer so that it can be solvent cast or coated as described. Although the films tested in the table were not necessarily exactly 5 mils thick, the data set forth was adjusted accordingly so as to be properly comparable.

TABLE I

Properties of Solvent Cast Polycarbonate and Comparative Films Approximately 0.005 inch Thick

| Mole percent BPA | Mole percent TCBPA | Young's Modulus (10⁴ kg./sq. cm.) | | | Flexibility (MIT Folds) | | | Heat Softening Temperature (° C.) | | |
|---|---|---|---|---|---|---|---|---|---|---|
| | | Random | Mixed | Block | Random | Mixed | Block | Random | Mixed | Block |
| 100 | 0 | 2.3 | -- | -- | 148 | -- | -- | 157 | -- | -- |
| 80 | 20 | 2.3 | -- | -- | 62 | -- | -- | 154 | -- | -- |
| 75 | 25 | -- | 2.6 | 2.5 | -- | 150 | 85 | -- | 202 | 165 |
| 70 | 30 | 2.3 | -- | -- | 47 | -- | -- | 150 | -- | -- |
| 50 | 50 | 2.9 | 2.6 | 3.0 | 18 | 117 | 30 | 159 | 206 | 140 |
| 30 | 70 | 2.9 | -- | -- | 10 | -- | -- | 172 | -- | -- |
| 25 | 75 | -- | 2.75 | 3.0 | -- | 65 | 70 | -- | 219 | 220-240 |
| 20 | 80 | 2.9 | -- | -- | 13 | -- | -- | 200 | -- | -- |
| 0 | 100 | 3.0 | -- | -- | 16 | -- | -- | 220-240 | -- | -- |
| Cellulose Triacetate | | 3.0-4.0 | -- | -- | 25-35 | -- | -- | 155 | -- | -- |
| Polystyrene (oriented) | | 3.2 | -- | -- | 50 | -- | -- | 100 | -- | -- |

The film supports for photographic purposes contemplated by this invention can be coated with photographic emulsions so as to form a photographic element having unusually valuable properties. The coating of film bases with photographic emulsions is well known in the art and is described in numerous patents and publications such as in a paper by Trivelli and Smith, The Photographic Journal, vol. 79, pages 330-338, 1939. Emulsions such as those described by Trivelli et al. can be readily coated upon the surface of the film base encompassed by this invention using standard coating techniques.

A photographic element was prepared by coating such an emulsion as described by Trivelli and Smith upon the film base described in Example 1.

In a container with temperature control was put a solution with the following composition:

(A)

Potassium bromide _____ gm__ 165
Potassium iodide _____ gm__ 5
Gelatin _____ gm__ 65
Water _____ cc__ 1700

And in another container was put a filtered solution consisting of:

(B)

Silver nitrate _____ gm__ 200
Water _____ cc__ 2000

Solution A was kept at a temperature of 70° C. during precipitation and ripening, while solution B was put in a separating funnel at a temperature of 72° C. The silver nitrate solution ran from the separating funnel through a calibrated nozzle into the container, the contents of which were kept in constant motion during precipitation and ripening, and, later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

The photographic elements prepared as described were exposed to light and tested to determine their characteristics and found to behave satisfactorily in all regards and to have exceptionally advantageous properties at temperatures in excess of 150° C., a quite satisfactorily high degree of flexibility, and a Young's Modulus of elasticity adequate for normal photographic purposes, especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, cf. U.S. 2,570,478.

In the data presented herein the flexibility test was performed and the values recorded as regards well cured films. The tests were performed using an MIT folding endurance tester made by Tinius Olsen; the technique employed is that originally designed some years ago for testing the flexibility of paper and now generally recognized as applicable to sheets of synthetic resins, viz. ASTM Method D 643-43.

The mixed polymers as described herein are also useful as sheet packaging materials, adhesive tape bases, kinescope recording tape, dielectrics for condensers, etc. They have high melting points and are tough, elastic, tear resistant, resilient, are endowed with good electrical properties and are useful at high temperatures for applications such as carbon arc motion picture projection, etc.

Although this invention relates solely to mixtures of polycarbonates, it is apparent that additional improvements can also be incorporated in bisphenol A polycarbonate films by other techniques which may be employed to supplement the achievements of this invention. For example, the following dopes for the coating of film as follows can be prepared from unmodified bisphenol A polycarbonate and can also be prepared employing the mixed polymers covered by this invention. In the latter case the Young's Moduli were at least about $0.3 \times 10^4$ kg./cm.² higher than the values presented below. The data was prepared from dopes made according to (a) and film was produced according to (b) as follows:

(a) 10 to 20 parts of a plasticizer such as triphenyl phosphate or methyl phthalate based on 100 parts dry polymer was doped in a suitable solvent, e.g. methylene chloride alone or mixed with other related dope-forming solvents.

(b) Films containing plasticizer have a Young's Modulus=$2.8 \times 10^4$ kg./cm.² as compared with 2.2-2.4 for unplasticized base. Tensile strength values are increased from 630 to 850 kg./cm.². Residual solvent in plasticized base is less than 0.1% as compared with 1.4% in unplasticized base cured by the same procedure.

The following examples are illustrative as to homopolymers; the same can be applied to mixed polymers for preparing polycarbonate dopes containing plasticizers.

EXAMPLE A

A dope consisting of 100 grams polycarbonate (intrinsic viscosity=1.0 to 2.0) dissolved in 400 grams methylene chloride was mixed thoroughly with 10-20 grams triphenyl phosphate, coated on glass plates, stripped and cured 20 hours in an air oven at 70° C. Physical properties of cured sheets are shown in the following table.

TABLE II

| Polycarbonate + | Young's Modulus kg./cm.² | Yield Strength, kg./cm.² | Tensile Strength, kg./cm.² | Elongation, Percent | Residual Solvent (Weight percent) |
|---|---|---|---|---|---|
| 0 plasticizer | 2.13 | 630 | 725 | 100 | 1.41 |
| +10 parts triphenyl phosphate | 2.56 | 770 | 770 | 4 | 0.50 |
| +15 parts triphenyl phosphate | 2.86 | 855 | 855 | 4 | 0.05 |
| +20 parts triphenyl phosphate | 2.86 × 10⁴ | 780 | 780 | 15 | |

EXAMPLE B

A dope consisting of 100 grams polycarbonate dissolved in 400 grams methylene chloride was mixed thoroughly with 10 grams methyl phthalate, coated, stripped and cured 20 hours in a 70° C. air oven. Physical properties of cured sheets are shown in the following table.

TABLE III

| Polycarbonate + | Young's Modulus, kg./cm.² | Yield Strength, kg./cm. | Tensile Strength, kg./cm.² | Elongation Percent |
|---|---|---|---|---|
| 0 plasticizer | 2.10 | 610 | 610 | 52 |
| +10 parts methyl phthalate | 2.53 × 10⁴ | 634 | 634 | 20 |

It appears that the addition of plasticizer to polycarbonate dopes facilitates removal of solvent, which may account for an increase in modulus and tensile strength. However, studies on more rigorous curing of unplasticized films indicate that other factors are involved. For example, when unplasticized film of 1% residual solvent and Young's Modulus 2.0–2:2×10⁴ kg./cm.² is cured further to residual solvent 0.1% or less, the modulus increased only to 2.4–2.5×10⁴ kg./cm.² instead of the 2.6–2.8×10⁴ kg./cm.² obtained with plasticized films. It appears that the presence of plasticizer facilitates solvent removal and yields a film of different structure from that obtained in the absence of plasticizer.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An improved polycarbonate predominantly of bisphenol A consisting of a physical mixture of highly polymeric homopolymers essentially composed of:

I. From 70 to 80 mole percent of a homopolymer composed of recurring units having the following formula (A):

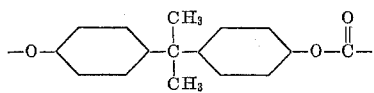

and

II. From 20 to 30 mole percent of a homopolymer composed of recurring units having the following formula (B):

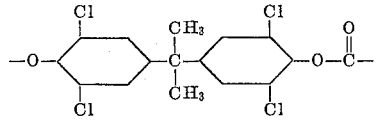

wherein each of the polycarbonate components has an inherent viscosity measured in chloroform of from 0.9 to 1.8 with both components of the mixture being no further apart in inherent viscosity than about 0.2 unit, said mixture of polymers being characterized by (a) having a heat softening temperature which is at least 35° C. greater than a random copolymer having the same overall composition of recurring units and is at least 190°–210° C., (b) having a Young's Modulus of elasticity for film which is at least 10% greater than for both the homopolymer of units of formula (A) and the said random copolymer and is at least 25,500 kg./sq. cm., and (c) having a flexibility measured by MIT folds test substantially as great as for the homopolymer of units of formula (A), at least 100% greater than for said random copolymer and is on the order of about 150 folds.

2. An improved film of a polycarbonate as described in claim 1 wherein the mole percent of said homopolymer composed of said units having formula B is 25%, said mixed polymer being characterized in having a heat softening temperature of about 200° C., having a Young's Modulus of elasticity of about 26,000 kg./sq. cm. and having a flexibility measured by the MIT folds test on the order of about 150.

References Cited in the file of this patent

UNITED STATES PATENTS

| 2,455,652 | Bralley et al. | Dec. 7, 1948 |
| 2,789,765 | Reynolds et al. | Apr. 23, 1957 |
| 2,799,666 | Caldwell | July 16, 1957 |
| 2,852,378 | Nadeau et al. | Sept. 16, 1958 |
| 2,874,046 | Klockgether et al. | Feb. 17, 1959 |
| 2,970,131 | Moyer et al. | Jan. 31, 1961 |

OTHER REFERENCES

Schnell: Angewandte Chemie, 68, 633–660, No. 20, Oct. 21, 1956.
"Chemical Week," June 1, 1957, pages 57–60.
"Industrial and Engineering Chemistry," vol. 51, No. 2, February 1959, pp. 157–160.